(12) United States Patent
Sipila

(10) Patent No.: US 8,286,058 B2
(45) Date of Patent: Oct. 9, 2012

(54) BLIND TRANSPORT FORMAT DETECTION BASED ON DECODER METRIC

(75) Inventor: Teemu Sipila, Oulunsalo (FI)

(73) Assignee: Nokia Corporation, Espoo (FI)

( * ) Notice: Subject to any disclaimer, the term of this patent is extended or adjusted under 35 U.S.C. 154(b) by 1220 days.

(21) Appl. No.: 11/887,764

(22) PCT Filed: Apr. 7, 2005

(86) PCT No.: PCT/IB2005/000916
§ 371 (c)(1),
(2), (4) Date: Oct. 3, 2007

(87) PCT Pub. No.: WO2006/106377
PCT Pub. Date: Oct. 12, 2006

(65) Prior Publication Data
US 2009/0287984 A1 Nov. 19, 2009

(51) Int. Cl.
*H03M 13/00* (2006.01)
(52) U.S. Cl. ......... 714/779; 714/786; 714/795; 375/341
(58) Field of Classification Search ............. 714/776, 714/779, 786, 795, 819; 375/341
See application file for complete search history.

(56) References Cited

U.S. PATENT DOCUMENTS

| | | | |
|---|---|---|---|
| 5,751,725 A | 5/1998 | Chen | |
| 5,774,496 A | 6/1998 | Butler et al. | |
| 6,934,321 B2 * | 8/2005 | Sato | 375/150 |
| 6,961,326 B1 * | 11/2005 | Chang et al. | 370/338 |
| 7,979,782 B2 * | 7/2011 | Eder et al. | 714/795 |
| 2003/0198253 A1 * | 10/2003 | Ahmed | 370/470 |
| 2005/0091566 A1 * | 4/2005 | Berens et al. | 714/755 |

FOREIGN PATENT DOCUMENTS

| | | |
|---|---|---|
| EP | 0 817 440 | 2/2001 |
| EP | 1432165 | 6/2004 |
| EP | 1 030 460 | 12/2005 |
| EP | 1 432 165 | 8/2006 |
| WO | 2004/040775 | 5/2004 |

OTHER PUBLICATIONS

Shin-Lin Shieh; Shih-Tsung Kuo; Po-Ning Chen; Yunghsiang, H.S.;, "Strategies for blind transport format detection using cyclic redundancy check in UMTS WCDMA," Wireless and Mobile Computing, Networking and Communications, 2005. (WiMob'2005), IEEE International Conference on, vol. 2, no., pp. 44-50 vol. 2, Aug. 22-24, 2005.*

Wang, M.M.; Brown, T.; , "Optimal blind transport format detection for UMTS uplink," Wireless Personal Multimedia Communications, 2002. The 5th International Symposium on , vol. 1, no., pp. 102-106 vol. 1, Oct. 27-30, 2002.*

(Continued)

*Primary Examiner* — Cynthia Britt
(74) *Attorney, Agent, or Firm* — Squire Sanders (US) LLP

(57) ABSTRACT

The present invention relates to a receiver device and method of detecting a block length of a data block in a data network, wherein a respective theoretical maximum value for a metric of a decoding operation is calculated for each of a plurality of candidate block lengths, and the calculated respective theoretical maximum value is compared to a respective actual value of the metric obtained for each of the plurality of candidate block lengths by the decoding operation. The candidate block length with the highest ratio between the respective actual value and the respective theoretical maximum value is then selected from the plurality of candidate block lengths to determine the block length of the data block.

26 Claims, 4 Drawing Sheets

OTHER PUBLICATIONS

Cohen et al., "Multi-rate detection for the IS-95 CDMA forward traffic channels" Global Telecommunication Conference, IEEE Singapore, Nov. 13-17, 1995, vol. 3, pp. 1789-1793.

Chinese Office Action; dated Oct. 21, 2011, Issued on Corresponding Application No. 200580049354.4.

\* cited by examiner

BLIND TRANSPORT FORMAT DETECTION BASED ON DECODER METRIC

FIELD OF THE INVENTION

The present invention relates to a method, terminal device, network element and system for blind transport format detection in a data network, such as a radio access network of a $3^{rd}$ generation mobile communication system.

BACKGROUND OF THE INVENTION

In the downlink direction from $3^{rd}$ generation radio access networks to terminal devices, the length of each transmitted block of data (called transport block) is not fixed but changes basically all the time. The length of a block of data is thus unknown to the receiver. The term "transport format" is used here as a synonym for the transport block length. The transport format contains also other pieces of information than the block length, but the transport format is detected by detecting the block length. The length of a particular transport block can be signaled in a control channel using a transport format combination indicator (TFCI). If the length is not signaled, then the receiver has to detect the block length blindly. That operation is called blind transport format detection (BTFD).

The 3GPP ($3^{rd}$ Generation Partnership Project) specifications specify three types of BTFD. The names and brief simplified descriptions of them are presented below:
1. An Explicit Blind Transport Format Detection (EBTFD), where the base station has transmitted a transport block including data and a cyclic redundancy code (CRC). The length of the data block is unknown, but a set of possible lengths is known. The receiver has to estimate which block length is the most likely one.
2. A Guided Transport Format Detection (GTFD) which basically doesn't require any additional computing. The result of the EBTFD is used for GTFD.
3. A Single Transport Format Detection (STFD), where the base station has transmitted either nothing at all, or a transport block (set) including data and CRC. In other words, the transport block can have only one length. It is transmitted with that length or not at all. The receiver has to estimate which alternative is more likely.

In the following, two known approaches for blind transport format detection are described.

For STFD, where the possible data rates are zero and full rate, and CRC is only transmitted for full rate, blind transport format detection using received power ratio can be used. The transport format detection is then done using an average received power ratio of the Dedicated Physical Data Channel (DPDCH) to the Dedicated Physical Control Channel (DPCCH). In particular, the received power Pc per bit of the DPCCH is calculated from all pilot and power control bits per slot over a radio frame. Then, the received power Pd per bit of the DPDCH is calculated from X bits per slot over a radio frame, wherein X designates the number of DPDCH bits per slot when the transport format corresponds to full rate. If the average received power ratio Pd/Pc is determined to be larger than a threshold T for trans-port format detection, then the full rate transport format is detected. Else, the zero rate transport format detected.

For EBTFD, where the possible data rates are 0, . . . , (full rate)/r, . . . , full rate, and CRC is transmitted for all transport formats, blind transport format detection using CRC can be used. At the transmitter, the data stream with variable number of bits from higher layers is block-encoded using a cyclic redundancy check (CRC) and then convolutionally encoded. The CRC parity bits are attached just after the data stream with variable number of bits.

FIG. 2 shows an example of data with variable number of bits. In this example, four possible transport formats are available, and the transmitted end bit position has been selected as $n_{end}=3$.

In a known procedure of blind transport format detection using CRC, the receiver knows only the possible transport formats (or the possible end bit position) based on Layer-3 (L3) negotiation. The receiver performs Viterbi-decoding on the soft decision sample sequence. The correct trellis path of the Viterbi-decoder ends at the zero state at the correct end bit position. The blind transport format detection method using CRC traces back the surviving trellis path ending at the zero state (hypothetical trellis path) at each possible end bit position to recover the data sequence. For each recovered data sequence error-detection is performed by checking the CRC, and if there is no error, the recovered sequence is declared to be correct.

The following variable is defined:

$$S(n_{end}) = -10 \log((a_0(n_{end}) - a_{min}(n_{end}))/(a_{max}(n_{end}) - a_{min}(n_{end})))[dB] \quad (1)$$

where $a_{max}(n_{end})$ and $a_{min}(n_{end})$ are the maximum and minimum path-metric values among all survivors at end bit position $n_{end}$, and $a_0(n_{end})$ is the path-metric value at zero state.

In general, the term "metric" is used hereinafter to designate a measure of similarity between a received code word or signal and one of allowed or candidate code words or signals defined by the underlying coding procedure.

In order to reduce the probability of false detection (which happens if the selected path is wrong but the CRC misses the error detection), a path selection threshold D is introduced. The threshold D determines whether the hypothetical trellis path connected to the zero state should be traced back or not at each end bit position $n_{end}$. If the hypothetical trellis path connected to the zero state that satisfies the equation:

$$S(n_{end}) \leq D \quad (2)$$

is found, the path is traced back to recover the frame data, where D is the path selection threshold and a design parameter.

If more than one end bit positions satisfying equation (2) is found, the end bit position which has minimum value of $S(n_{end})$ is declared to be correct. If no path satisfying equation (2) is found even after all possible end bit positions have been exhausted, the received frame data is declared to be in error.

However, the above known procedures are quite complex and require separate handling of the EBTFD and STFD.

SUMMARY OF THE INVENTION

It is therefore an object of the present invention to provide a more general and less complex blind transport format detection approach which can be used for both EBTFD and STFD.

This object is achieved by a receiver device for receiving data blocks from a data network, said receiver device comprising:
calculating means for calculating for each of a plurality of candidate block lengths a respective theoretical maximum value for a metric of a decoding operation;
comparing means for comparing said calculated respective theoretical maximum value to a respective actual value of said metric obtained for each of said plurality of candidate block lengths by said decoding operation; and
determination means for selecting, based on the comparison result of said comparing means, from said plurality of candidate block lengths the candidate block length with the highest ratio between said respective actual value and said respective theoretical maximum value and for determining said block length of said data blocks based on said selected candidate block length.

Furthermore, the above object is achieved by a method of detecting a block length of a data block in a data network, said method comprising the steps of:

calculating for each of a plurality of candidate block lengths a respective theoretical maximum value for a metric of a decoding operation;

comparing said calculated respective theoretical maximum value to a respective actual value of said metric obtained for each of said plurality of candidate block lengths by said decoding operation;

selecting, based on the comparison result of said comparing step, from said plurality of candidate block lengths the candidate block length with the highest ratio between said respective actual value and said respective theoretical maximum value; and determining said block length of said data blocks based on said selected candidate block length.

Accordingly, a flexible and straight forward solution for blind transport format detection is provided which enables handling of conventionally separately handled cases, e.g. EBTFD and STFD, with the same algorithm or procedure. Moreover, complexity can be reduced, especially in the control part. The flexible approach based on the comparison of actual and theoretical path metrics enables a more consistent performance which is less dependent on the data block length. Implementation can be achieved without major changes of conventional receiver devices.

The decoding operation may be executed assuming the longest block length, wherein the respective actual values are saved during the decoding operation. In a specific case, such as STFD, the longest block length can be determined by multiplying a code rate by a length of an input vector of the decoding operation.

In cases such as EBTFD, the comparison may comprise checking an error correction code of a received data block, wherein the determination comprises selecting the candidate block length with the highest ratio between the respective actual value and the respective theoretical maximum value from those candidate block lengths with a positive error correction checking result. If only one of the candidate block lengths shows a positive error correction checking result, the determination may comprise selecting a candidate block length with a positive error correction checking result.

In cases such as STFD, the comparison may comprise checking an error correction code of a received data block, wherein the determination may comprise determining that data is present when a positive error correction checking result has been obtained. When a negative error correction checking result has been obtained in the comparison step and a ratio between the respective actual value and the respective theoretical maximum value higher than a predetermined threshold value has been determined, it is also determined that data is present. The predetermined threshold value may be determined based on the ratio between the number of uncoded data bits and the number of bits after coding in one data block.

The suggested solution may be implemented as concrete hardware circuits or an integrated chip device of the receiver device or as a computer program product comprising code means for producing the above functional steps when run on a computer device, which may be provided in or connected to the receiver device. The computer program product may be provided on a computer readable medium.

BRIEF DESCRIPTION OF THE DRAWINGS

In the following, the present invention will be described on the basis of a preferred embodiment with reference to the accompanying drawings in which.

DESCRIPTION OF THE PREFERRED EMBODIMENT

Figure 1:
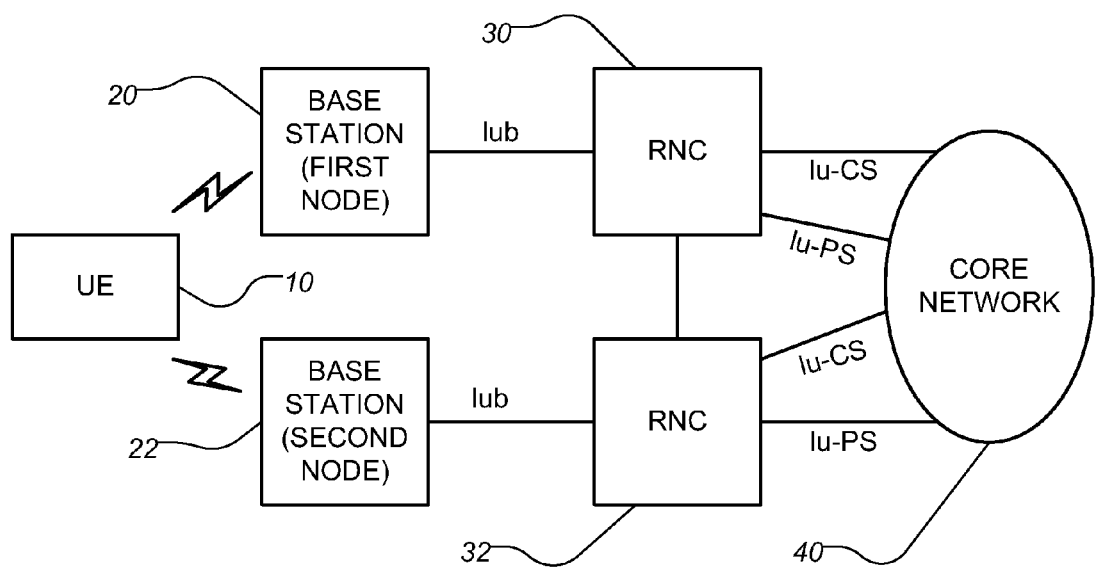
FIG. 1 shows a schematic diagram of network architecture in which the present invention can be implemented.
Figure 2:
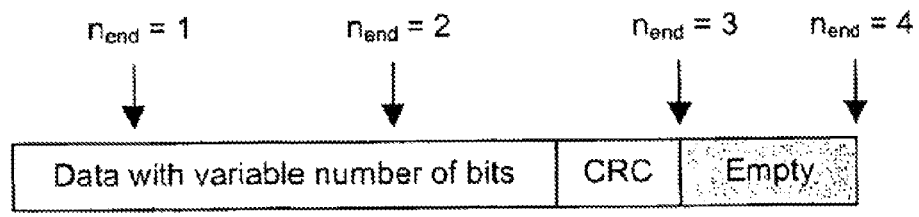
FIG. 2 shows an example of data with variable bit number and different transport formats.

The preferred embodiment will now be described on the basis of a $3^{rd}$ generation Wideband CDMA (WCDMA) radio access network architecture as shown in FIG. 1.

$3^{rd}$ generation mobile systems like UMTS (Universal Mobile Communications System) are designed to provide a wide range of services and applications to the mobile user. A mobile user gets access to UMTS through the WCDMA-based UTRAN (UMTS Terrestrial Radio Access Network). A base station or Node B 20, 22 terminates the L1 air interface and forwards the uplink traffic from a UE 10 to an RNC 30, 32. The RNCs 30, 32 are responsible for radio resource management (RRM) and control all radio resources within their part of the UTRAN. The RNCs 30, 32 are the key interface partners for the UE 10 and constitute the interface entity towards a core network 40, e.g. via a UMTS Mobile Switching Center or a Serving GPRS (General Packet Radio Services) Support Node (SGSN). Within the UTRAN, Asynchronous Transfer Mode (ATM) is used as the main transport technology for terrestrial interconnection of the UTRAN nodes, i.e. RNCs and Node Bs.

In the simplified sample architecture shown in FIG. 1, the UE 10 is connected via an air interface to a first Node B 20 and/or a second Node B 22. The first and second Node Bs 20, 22 are connected via respective Iub interfaces to first and second RNCs 30, 32 which are connected to each other via a Iur interface. The Node Bs 20, 22 are logical nodes responsible for radio transmission and reception in one or more cells to/from the UE 10 and terminate the Iub interface towards the respective RNC 30, 32. The RNCs 30, 32 provide connections to the core network 40 for circuit switched traffic via a Iu-CS interface and for packet switched traffic via a Iu-PS interface. It should be noted that in a typical case many Node Bs are connected to the same RNC.

Figure 3:
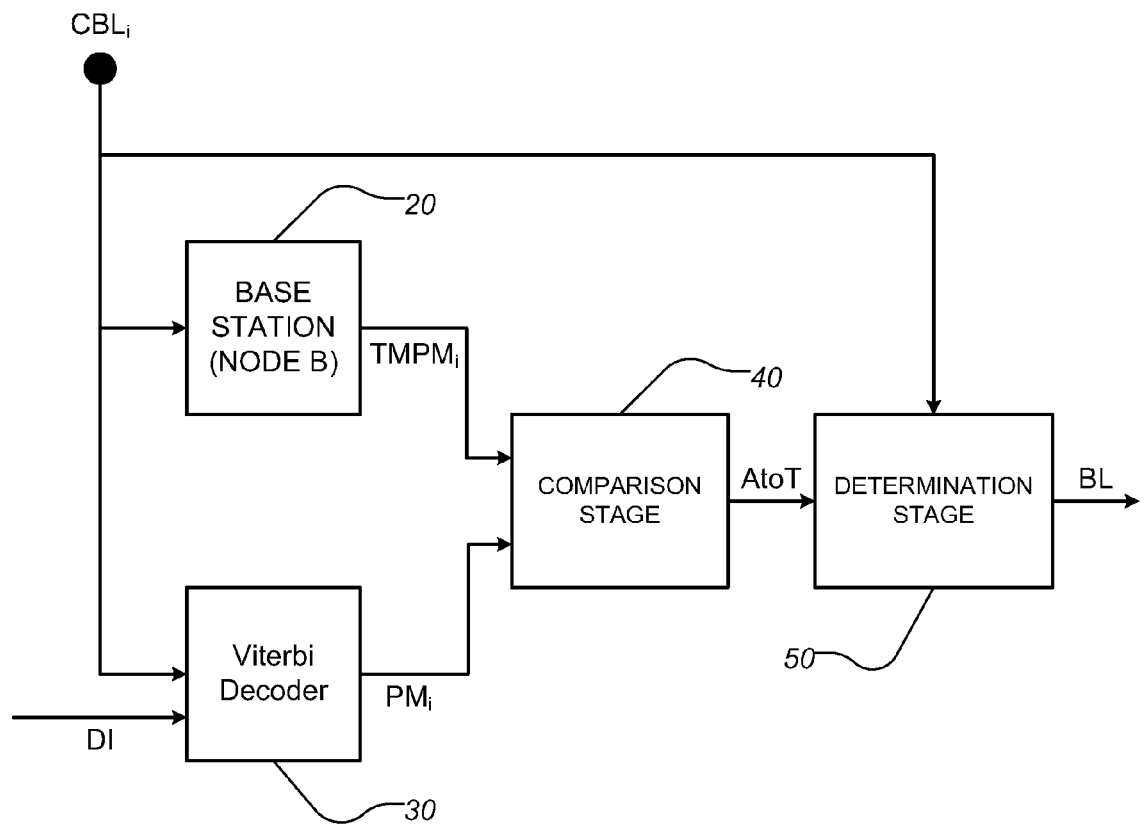
FIG. 3 shows a schematic block diagram of a blind transport format detection functionality according to the preferred embodiment.

FIG. 3 shows a schematic block diagram of a blind transport format detection functionality according to the preferred embodiment, which may be provided at a terminal device, e.g. the UE 10, or a base station device, e.g. the Node Bs 20, 22. A block length BL or transport format of a received block of data is detected or determined as follows:

Respective theoretical maximum values $TMPM_i$ for the cumulative path metrics of a Viterbi decoder stage or function 30 are calculated for all possible non-zero length candidate block lengths $CBL_i$. The actual cumulative path metrics $PM_i$ are determined in the Viterbi decoder function 30 based on the received input signal DI and the possible candidate block lengths $CBL_i$. The obtained actual path metrics $PM_i$ are then compared in a comparison stage or function 40 to the calculated theoretical maximum path metrics $TMPM_i$. The comparison function 40 is configured to determine or calculate for each candidate block length $CBL_i$ a respective ratio AtoT between the actual path metrics $PM_i$ and the theoretical maximum path metrics $TMPM_i$. Finally, at a determination stage or function 50 the candidate block length $CBL_i$ with the highest actual-to-theoretical ratio AtoT is selected and determined as the block length BL. If a zero-length candidate is compared to a non-zero candidate, then the non-zero candidate is selected if the actual-to-theoretical ration AtoT is above a predetermined threshold.

The actual path metric $PM_i$ and the theoretical maximum path metric $TMPM_i$ are be obtained as follows:

Let $r=[r[0], \ldots, r[N-1]] \in \mathfrak{R}^N$, where $\mathfrak{R}$ is the set of real numbers, be the input signal DI to the Viterbi algorithm executed by the Viterbi decoder function 30. N is the length of the input vector. The data word, i.e. the output of the Viterbi algorithm, has a length of NR, where R is the code rate. The metric (or path metric) that the Viterbi algorithm uses to make the decision on the most likely codeword is essentially a correlation metric. It can be shown that it is a maximum likelihood (ML) metric in an AWGN (Additive White Gaussian Noise) channel. The cumulative path metric of state zero at the end of the trellis is the numerical value of the correlation between the input signal r and the closest codeword that can be found in the codebook, i.e., the set of all possible code words.

The correlation between the maximum-likelihood codeword $c=[c[0], \ldots, c[N-1]] \in \{\pm 1\}^N$ and the received signal r is the (cumulative) path metric at state zero at the end of the trellis. The actual path metric PM is thus obtained as follows:

$$PM = r \cdot c = \sum_{n=0}^{n=N-1} r(n)c(n) = \sum_{n=0}^{n=N-1} \begin{cases} r(n), & \text{if } c(n) = 1 \\ -r(n), & \text{if } c(n) = -1 \end{cases} \quad (3)$$

It can be noticed that the path metric PM is sum of the elements of the input vector with each sign switched or not, depending on the value (+1 or −1) of the corresponding element in c. From equation (3) it can also be seen, that if r is given, there is a maximum to the path metric, which can be computed without doing the actual Viterbi decoding (i.e. without knowing c). The value of the theoretical maximum path metric is $$TMPM = \sum_{n=0}^{n=N-1} |r(n)| \quad (4)$$

It is achieved when all of the negative samples get their signs changed but none of the positive samples. For a noiseless and errorless input vector, the actual path metric PM would be equal to the theoretical maximum path metric TMPM.

The actual path metric PM can be shown to be closer to the theoretical maximum path metric TMPM, if the ML-estimate c is equal to the transmitted codeword $c_{TX}$ than when it is not equal. And naturally when c differs a little from $c_{TX}$, the actual path metric is closer to the TMPM than when c differs a lot from $c_{TX}$. Also, the more noise r contains, the farther away the actual path metric is from the TMPM. At the extreme, when there is only noise and no data, the actual path metric is expected to be at its farthest from the TMPM (on average).

Thus, a decision metric can be defined as follows:

$$AtoT = \frac{PM}{TMPM} = \frac{\sum_{n=0}^{n=N-1} r(n)c(n)}{\sum_{n=0}^{n=N-1} |r(n)|} \quad (5)$$

which is the ratio of the actual path metric PM to the theoretical maximum path metric TMPM. The maximum value for AtoT (Actual-to-Theoretical) is 1.0. A rough rule of thumb would be that the closer the AtoT is to 1.0, the more likely it is that the input signal contained some real data. In fact, a noiseless and perfectly correct input signal would yield AtoT=1.0.

In the following, the use of the above detection procedure for the EBTFD case is described. In EBTFD, the basic problem setup is as follows: The base station or Node B has transmitted a transport block (set) including data and CRC. The length of the data block is unknown, but a set of possible lengths is known. The receiver at the terminal device has to estimate which block length is the most likely one.

Figure 4:
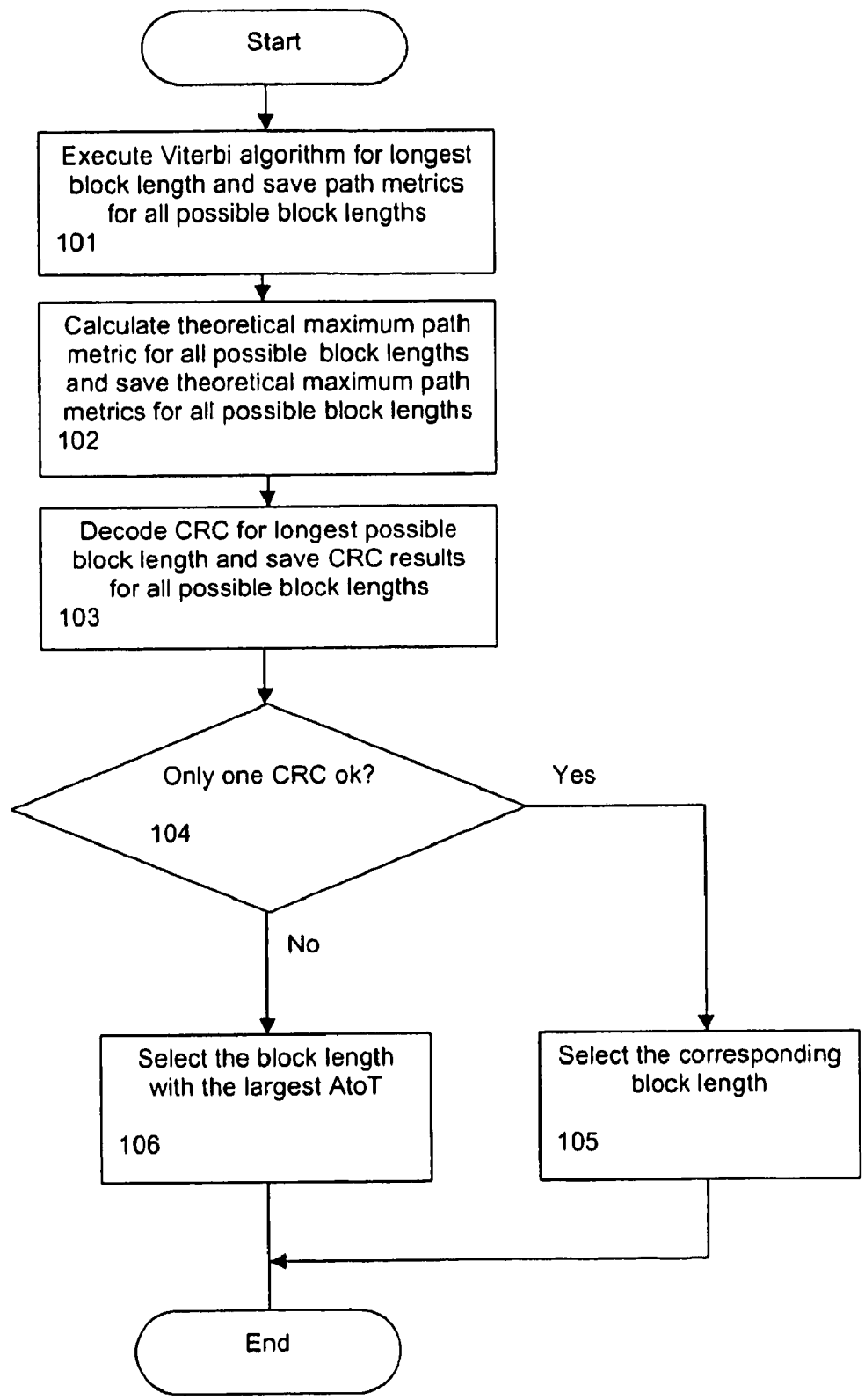
FIG. 4 shows a schematic flow diagram of a blind transport format detection procedure for EBTFD according to the preferred embodiment.

FIG. 4 shows a schematic flow diagram of a blind transport format detection procedure for EBTFD according to the preferred embodiment.

In step 101, Viterbi decoding is performed by the Viterbi decoder function 30 assuming the longest block length in the list of candidate block lengths $CBL_i$. During the Viterbi run, the values of the actual path metrics $PM_i$ are stored or saved for each candidate block length $CBL_i$. As an alternative option, the Viterbi algorithm can be run separately for each candidate block length $CBL_i$ and then the actual path metric $PM_i$ is saved from each run.

Then, in step 102, respective theoretical maximum path metrics $TMPM_i$ are calculated by the calculation function 20 for all possible block lengths $CBL_i$ according to equation (4). This can be done in parallel with the Viterbi decoding, or separately. In the following step 103 CRC-decoding is performed, e.g. by the comparison function 40 or a separate function not shown in FIG. 3, for the longest block length in the list of candidate block lengths $CBL_i$. During the CRC decoding run, intermediate CRC-results for the other candidate block lengths are saved.

In a following branching step 104, it is decided if only one of the candidate block lengths $CBL_i$ shows an OK CRC result (i.e. correct CRC has been determined). If so, the corresponding candidate block length is selected in step 105 by the determination function 50 and determined as the valid or estimated block length BL. This can be performed at the comparison function 40 of FIG. 3. If many candidate block lengths or no candidate block length show an OK CRC result, from among them, the one that has the largest AtoT, as calculated according to equation (3), is selected by the determination function 50 and determined in step 106 as valid or estimated block length BL in step.

In the following, the use of the above detection procedure for the STFD case is described. In STFD, the basic problem setup is as follows: The base station has transmitted either nothing at all, or a transport block (set) including data and CRC, which are convolutinally coded in a coded vector of length N. In the receiver, it has to be estimated which alternative is more likely—no data or "full rate".

Figure 5:
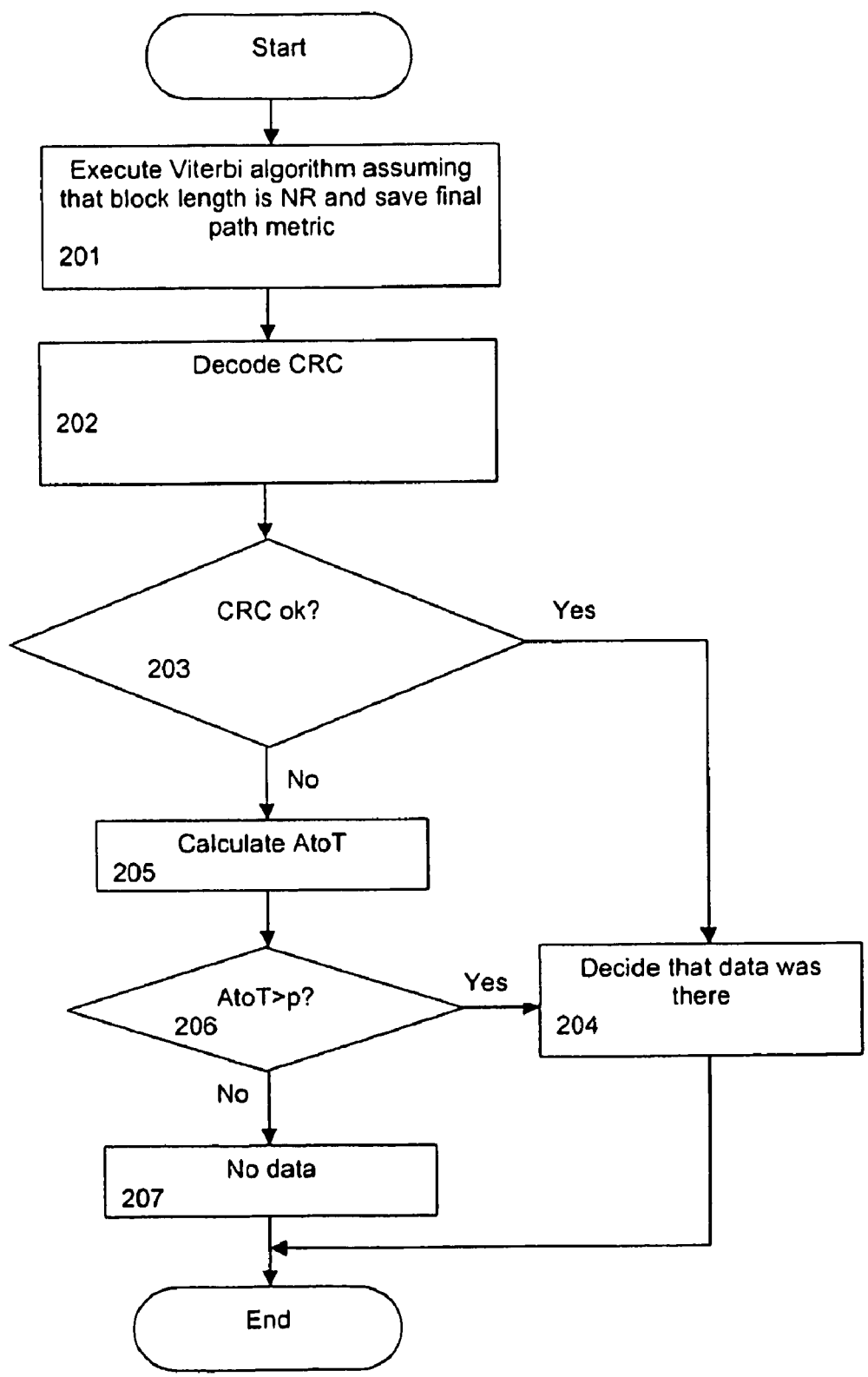
FIG. 5 shows a schematic flow diagram of a blind transport format detection procedure for STFD according to the preferred embodiment.

FIG. 5 shows a schematic flow diagram of a blind transport format detection procedure for STFD according to the preferred embodiment. Here, the ratio AtoT can be used for deciding whether there is data or not, as follows:

In step 201, Viterbi decoding is executed at the Viterbi decoder function 30 assuming that there is data of length NR. The final path metric $PM_i$ is saved. Then, in step 202, CRC-decoding is performed, e.g., by the comparison function 40 or a separate function not shown in FIG. 3.

In a following branching step 203 which can be performed by the comparison function 40, it is decided if CRC shows OK. If so, it is decided by the determination function 50 in step 204 that there was data and the procedure stops here. On the other hand, if CRC shows NOT OK in step 203, the ratio AtoT is calculated in step 205 by the comparison function 40 according to equation (3). This can be done in parallel with the Viterbi decoding referred to in step 203.

In a subsequent second branching step 206, the ratio AtoT is compared by the comparison function 40 to a predetermined threshold value p. If the ratio AtoT is greater than the threshold value p, it is decided by the determination function 50 in step 207 that there was data.

The variable p can b computed in many ways, but in the preferred embodiment of the invention it is computed as follows:

$$p = \min\{a \log_2(R_{eff}) + b, p_{max}\} \quad (6)$$

where a and b are tunable parameters and $p_{max}$ is a number a little less than 1.0, for example $p_{max}$=0.99. Since the ratio AtoT can never be greater than 1.0, the parameter $p_{max}$ makes sure that p is not equal to or greater than 1.0 either. The variable $R_{eff}$ is the effective coding rate, which is computed as the ratio of the number of uncoded data bits to the number of bits after coding and possible puncturing (in one transmitted block of data).

In summary, a receiver device and method of detecting a block length of a data block in a data network have been described, wherein a respective theoretical maximum value for a metric of a decoding operation is calculated for each of a plurality of candidate block lengths, and the calculated respective theoretical maximum value is compared to a respective actual value of the metric obtained for each of the plurality of candidate block lengths by the decoding operation. The candidate block length with the highest ratio between the respective actual value and the respective theoretical maximum value is then selected from the plurality of candidate block lengths to determine the block length of the data block.

It is to be noted that the present invention is not restricted to the above preferred embodiment but can be implemented in connection with any detection of a block length of data blocks in any kind of data network, where a decoding operation based on a calculation of path metrics is used. In particular, the invention is not restricted to the downlink direction of a cellular network and can be implemented in any data transmission link. Moreover, the invention is not limited to convolutionally coded system in which convolutional codes or Viterbi algorithms are used. The invention has successfully been implemented in connection with other coding schemes using for example simple metrics rather than cumulative path metrics. The preferred embodiment may thus vary within the scope of the attached claims.

The invention claimed is:

1. An apparatus for receiving data blocks from a data network, said apparatus comprising:
   at least one processor; and
   at least one memory storing computer program code, the at least one memory and the computer program code configured, with the at least one processor, to cause the apparatus at least to
   calculate for each of a plurality of candidate block lengths a respective theoretical maximum value for a metric of a decoding operation;
   compare said calculated respective theoretical maximum value to a respective actual value of said metric obtained for each of said plurality of candidate block lengths by said decoding operation;
   select, based on the comparison result of said comparing, from said plurality of candidate block lengths the candidate block length with the highest ratio between said respective actual value and said respective theoretical maximum value; and
   determine said block length of said data blocks based on said selected candidate block length.

2. The apparatus according to claim 1, wherein the at least one memory and the computer program code configured, with the at least one processor, to cause the apparatus at least to perform said decoding operation.

3. The apparatus according to claim 2, wherein said decoding operation comprises Viterbi decoding.

4. The apparatus according to claim 2, wherein the at least one memory and the computer program code configured, with the at least one processor, to cause the apparatus at least to execute said decoding operation assuming the longest block length and to save said respective actual values during said decoding operation.

5. The apparatus according to claim 4, wherein the at least one memory and the computer program code configured, with the at least one processor, to cause the apparatus at least to determine said longest block length by multiplying a code rate by a length of an input vector of said decoding operation.

6. The apparatus according to claim 1, wherein the at least one memory and the computer program code configured, with the at least one processor, to cause the apparatus at least to check an error correction code of a received data block, and to select the candidate block length with the highest ratio between said respective actual value and said respective theoretical maximum value from those candidate block lengths with a positive error correction checking result of said comparison.

7. The apparatus according to claim 6, wherein the at least one memory and the computer program code configured, with the at least one processor, to cause the apparatus at least to select a candidate block length with a positive error correction checking result of said comparison, if only one of said candidate block lengths shows a positive error correction checking result.

8. A network element comprising the apparatus according to claim 1.

9. A terminal device comprising the apparatus according to claim 1.

10. An integrated chip device configured as the apparatus according to claim 1.

11. A system for transmitting data packets in a data network, said system comprising the apparatus according to claim 1.

12. An apparatus for receiving data blocks from a data network, said apparatus comprising:
- at least one processor; and
- at least one memory storing computer program code, the at least one memory and the computer program code configured, with the at least one processor, to cause the apparatus at least to
- calculate for each of a plurality of candidate block lengths a respective theoretical maximum value for a metric of a decoding operation;
- compare said calculated repective theoretical maximum value to a respective actual value of said metric obtained for each of said plurality of candidate block lengths by said decoding operation; and
- check an error correction code of a received data block, and to determine that data is present when a positive error correction checking result has been obtained by said comparison.

13. The apparatus according to claim 12, wherein said predetermined threshold value is determined based on the ratio between the number of uncoded data bits and the number of bits after coding in one data block.

14. An apparatus for receiving data blocks from a data network, said apparatus comprising:
- at least one processor; and
- at least one memory storing computer program code, the at least one memory and the computer program code configured, with the at least one processor, to cause the apparatus at least to
- calculate for each of a plurality of candidate block lengths a respective theoretical maximum value for a metric of a decoding operation;
- compare said calculated respective theoretical maximum value to a respective actual value of said metric obtained for each of said plurality of candidate block lengths by said decoding operation; and
- check and error correction code of a received data block, and to determine that data is present when a negative error correction checking result has been obtained by said comparison and a ratio between said respective actual value and said respective theoretical maximum value higher than a predetermined threshold value has been determined by said comparison.

15. The apparatus according to claim 14, wherein said predetermined threshold value is determined based on the ratio between the number of uncoded data bits and the number of bits after coding in one data block.

16. A method of detecting a block length of a data block in a data network, said method comprising:
- calculating for each of a plurality of candidate block lengths a respective theoretical maximum value for a metric of a decoding operation;
- comparing said calculated respective theoretical maximum value to a respective actual value of said metric obtained for each of said plurality of candidate block lengths by said decoding operation;
- selecting, based on the comparison result of said comparing, from said plurality of candidate block lengths the candidate block length with the highest ratio between said respective actual value and said respective theoretical maximum value; and
- determining said block length of said data blocks based on said selected candidate block length.

17. A method according to claim 16, wherein said decoding operation comprises Viterbi decoding.

18. A method according to claim 16, wherein said decoding operation is executed assuming the longest block length and wherein said respective actual values are saved during said decoding operation.

19. A method according to claim 18, wherein said longest block length is determined by multiplying a code rate by a length of an input vector of said decoding operation.

20. A method according to claim 16, wherein said comparing comprises checking an error correction code of a received data block, and wherein said determining comprises selecting the candidate block length with the highest ratio between said respective actual value and said respective theoretical maximum value from those candidate block lengths with a positive error correction checking result of said comparing.

21. A method according to claim 20, wherein said determining comprises selecting a candidate block length with a positive error correction checking result of said comparing, if only one of said candidate block lengths shows a positive error correction checking result.

22. A method according to claim 16, wherein said comparing comprises checking an error correction code of a received data block, and wherein said determining comprises determining that data is present when a positive error correction checking result has been obtained in said comparing.

23. A method according to claim 22, wherein said determining comprises determining that data is present when a negative error correction checking result has been obtained in said comparing and a ratio between said respective actual value and said respective theoretical maximum value higher than a predetermined threshold value has been determined in said comparing.

24. A method according to claim 23, wherein said predetermined threshold value is determined based on the ratio between the number of uncoded data bits and the number of bits after coding in one data block.

25. A computer program product comprising code means for producing the method of claim 16 when run on a computer device.

26. A computer readable medium comprising a computer program product according to claim 25.

* * * * *